(12) United States Patent
Rastogi et al.

(10) Patent No.: US 7,405,498 B2
(45) Date of Patent: Jul. 29, 2008

(54) MULTI-LEVEL ACTIVE FILTER

(75) Inventors: Mukul Rastogi, Monroeville, PA (US);
Peter Hammond, Greensburg, PA (US);
Stan Simms, Delmont, PA (US)

(73) Assignee: Siemens Energy & Automation, Inc.,
Alpharetta, GA (US)

( * ) Notice: Subject to any disclaimer, the term of this patent is extended or adjusted under 35 U.S.C. 154(b) by 84 days.

(21) Appl. No.: 11/435,181

(22) Filed: May 16, 2006

(65) Prior Publication Data

US 2007/0109823 A1 May 17, 2007

Related U.S. Application Data

(60) Provisional application No. 60/681,621, filed on May 17, 2005.

(51) Int. Cl.
*H02J 1/02* (2006.01)
(52) U.S. Cl. .................................... 307/105
(58) Field of Classification Search ................ 323/205, 323/207; 363/39, 40, 43, 65, 67, 69–72; 307/105; 327/552
See application file for complete search history.

(56) References Cited

U.S. PATENT DOCUMENTS

| 5,625,545 | A |   | 4/1997  | Hammond |         |
|-----------|---|---|---------|---------|---------|
| 5,638,263 | A |   | 6/1997  | Opal et al. |     |
| 5,986,909 | A | * | 11/1999 | Hammond et al. | 363/65 |
| 6,014,323 | A | * | 1/2000  | Aiello et al.  | 363/71 |
| 6,075,350 | A |   | 6/2000  | Peng    |         |
| 6,262,555 | B1 |  | 7/2001  | Hammond et al. | |
| 6,377,478 | B1 |  | 4/2002  | Morishita |       |
| 6,411,530 | B2 |  | 6/2002  | Hammond et al. | |
| 6,417,644 | B2 |  | 7/2002  | Hammond et al. | |

FOREIGN PATENT DOCUMENTS

WO    EP0911951 A    4/1999

OTHER PUBLICATIONS

Hikeaki Fujita et al., "A practical approach to switching—loss reduction in a large-capacity static var compensator based on voltage-source inverters"; IEEE Transactions on Industry Applications, IEEE Service Center, Piscataway, NJ, US; vol. 36, No. 5, Sep. 2000, p. 1396-1404.

Peng F et al., Cascade multilevel inverters for utility applications, Proceedings of the IECON '97 : 23rd International Conference on Industrial Electronics, Control and Instrumentation. New Orleans, Nov. 9-14, 1997, Proceedings of IEEE IECON: International Conference on Industrial Electronics, Control and Instrum, vol. 2, No. 9, 1997; pp. 437-442.

(Continued)

*Primary Examiner*—Shawn Riley

(57) ABSTRACT

A multi-phase active filter includes a group of power cells electrically connected in a three-phase configuration, a pre-charging circuit, and a controller that controls the voltage delivered to the plurality of power cells. Each power cell includes an inverter having a pair of direct current (DC) terminals, at least one capacitor electrically connected in parallel with the inverter, and an energy dissipating circuit that is electrically connected in parallel with the inverter. The energy dissipating circuit of each power cell self-regulates DC voltage within the cell.

20 Claims, 9 Drawing Sheets

OTHER PUBLICATIONS

Geza Joos et al., "Direct-coupled Multilevel Cascaded Series VAR Compensators", IEEE Industry Application Society Annual Meeting, New Orleans, Louisiana, Oct. 5-9, 1997, pp. 1608-1615.

Rolf Grunbaum et al., "Energy and Environmental Savings in Steel Making by Means of SVC Light", Electric Furnace Conference Proceedings, 2000, pp. 65-75.

Hirofumi Akagi, "New Trends in Active Filers for Power Conditioning", IEEE Transactions on Industry Applications, vol. 32, No. 6, Nov./Dec. 1996, pp. 1312-1322.

Miguel G. Lopez et al., "Performance Analysis of a Hybrid Asymmetric Multilevel Inverter for High Voltage Active Power Filter Applicaitons", IEEE, 2003, pp. 1050-1055.

Sunt Srianthumrong et al., "A Medium-Voltage Transformerless AC/DC Power Conversion System Consisting of a Diode Rectifier and a Shunt Hybrid Filter", IEEE, 2002, 8 pp.

* cited by examiner

MULTI-LEVEL ACTIVE FILTER

CROSS-REFERENCE TO RELATED APPLICATIONS

This application claims priority to, and incorporates by reference in its entirety, pending U.S. Provisional Patent Application No. 60/681,621, entitled "Multi-level active filter for medium voltage applications," filed May 17, 2005.

STATEMENT REGARDING FEDERAL SPONSORED RESEARCH

Not Applicable.

JOINT RESEARCH AGREEMENT

Not Applicable.

INCORPORATION BY REFERENCE OF MATERIAL ON DISC

Not Applicable.

BACKGROUND

An active filter is a device that modifies the amplitude and/or phase characteristics of a signal with respect to frequency, and which includes an amplification device to amplify the signal at relatively low frequencies. An active filter may be electrically positioned between a power source and a load, and can help to alleviate power quality issues introduced by harmonic currents and low power factor.

Currently, active filter solutions for industrial applications are available at low rated voltages (i.e., less than or equal to 690 volts). However, existing solutions for active filters at voltage levels above 1000 volts have distinct disadvantages. For example, attempts to provide a hybrid active filter that includes an inverter that is rated for a small fraction of the utility voltage have required large capacitors and expensive magnetic components, and such systems absorb a fixed level of leading reactive power (VARs), which results in poor power factor at medium and light loads.

The use of cascaded or series-connected inverters for compensation of fundamental reactive power (or VARs) is known. However, the circuits proposed to date have limited utility. Other attempts at using series-connected inverters have suggested square-wave mode of operation to reduce the losses in the inverters. However, in such systems, the number of harmonics that can be compensated is limited by the number of series connected inverters, as the higher harmonics require a larger number of inverters.

Accordingly, it is desirable to provide an improved filter for medium-voltage applications.

SUMMARY

In an embodiment, a multi-phase active filter includes at least three phases. Each phase includes a group of of power cells electrically connected in series. Each phase has a first end and a second end. The first ends of each phase are electrically coupled to each other, and the second ends of each phase are positioned to be electrically connected between a power source and a load at a point of common coupling. Each power cell includes an inverter having a pair of direct current (DC) terminals and an energy dissipating circuit that is electrically connected across the DC terminals of the inverter. The power cells may filter harmonic and reactive current generated by the load.

In some embodiments, each inverter is either an H-bridge inverter or a neutral point clamped single-phase inverter. Each cell also may include at least one capacitor electrically connected in parallel with the inverter. A central controller may ensures DC voltage sharing in each inverter by regulating power flow, so that each power cell self-regulates its DC voltage using its energy dissipating circuit.

In some embodiments, the filter may include a precharging circuit. The precharging may include a first contactor, a first inductor, and a second inductor electrically connected in series such that the first inductor is between the first inductor and the second inductor. The precharging circuit also may include a second contactor electrically connected in parallel across the first contactor and first inductor. The first contactor closes to energize the power cells, the second contactor closes when the power cells have charged to a nominal DC voltage, and the first contactor opens after the second contactor has closed.

In some embodiments, the filter includes a controller that monitors the voltage of each power cell and activates or deactivates the first contactor and second contactor based on data that it received from monitoring. In some embodiments, the energy dissipating circuit includes a transistor and a resistor, and the transistor shorts the inverter through the resistor to cause dissipation of energy through the resistor. Each cell may have a control circuit that activates the cell transistor and self-regulates voltage in the cell.

In an alternate embodiment, a multi-phase active filter includes at least three phases, each phase including a plurality of power cells electrically connected in series. Each phase has a first end and a second end, the first ends of each phase are electrically coupled to each other, and the second ends of each phase are positioned to be electrically connected between a power source and a load at a point of common coupling. Each power cell includes an inverter having a pair of DC terminals, a rectifier electrically connected across the DC terminals, and a capacitor that is electrically connected across the DC terminals. Each rectifier receives power from a set of dedicated three-phase secondary windings of a transformer. The transformer is external to the filter and may have a volt ampere rating that is less than a volt-ampere rating of the filter. A central controller may commands power flow out of the active filter.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
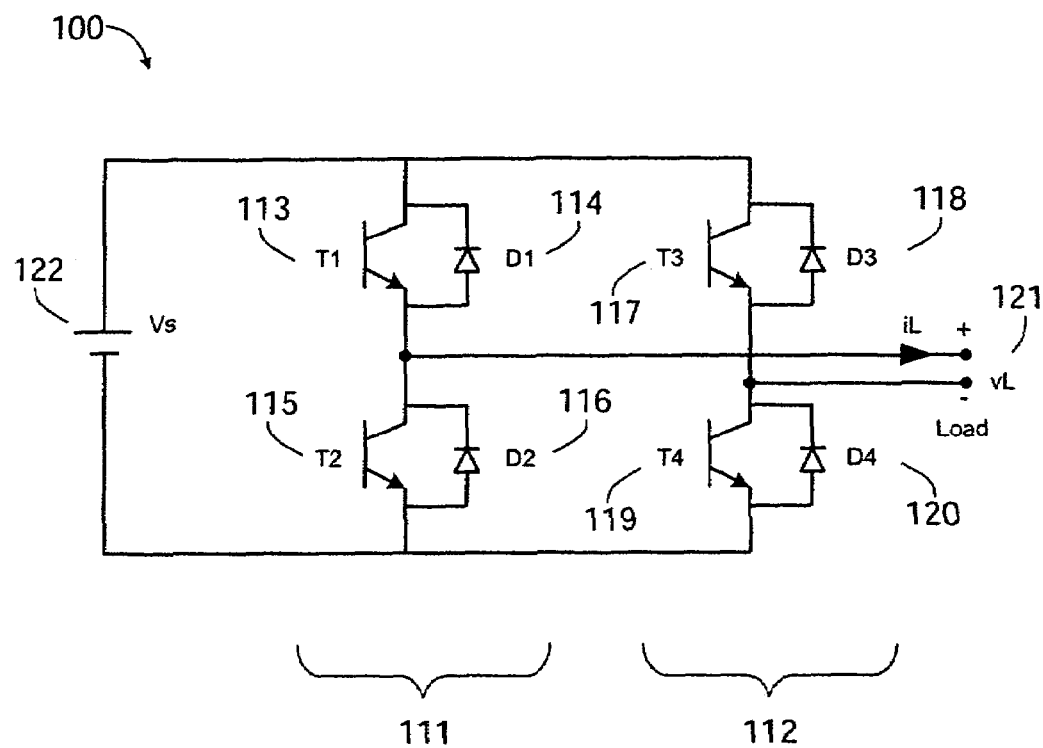
FIG. 1 is a circuit diagram of an exemplary H-bridge inverter.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. In addition, the following terms are intended to have the following definitions herein:

active filter—device that modifies the amplitude and/or phase characteristics of a signal with respect to frequency, and which includes an amplification device to amplify the signal at relatively low frequencies.

comprising—including but not limited to.

contactor—a device that makes an electrical connection between when activated, and which breaks a circuit or otherwise makes no electrical connection when deactive.

electrically connected or electrically coupled—connected in a manner that is adapted to transfer electrical energy.

end—in an element of an electric circuit, a point at which the circuit either terminates or couples with another element.

energy dissipating circuit—a device or combination of devices, such as but not limited to a series-connected transistor and resistor, that can be activated to short-circuit an inverter or other device and dissipate energy through a resistive element of the short circuit H-bridge inverter—a circuit for controlled power flow between AC and DC circuits having four transistors and four diodes. Referring to FIG. 1, an H-bridge inverter generally includes a first phase leg 111 and a second phase leg 112. Each phase leg is electrically connected in parallel across a power source 122. Each leg includes two transistor/diode combinations (such as 113/114 and 115/116) connected in series. In each combination, the diode 114 is electrically coupled across the base and emitter of the transistor. A load 121 is electrically coupled to each leg between each leg's transistor/diode combinations.

harmonic distortion—an AC power signal, the ratio of a sum of the powers of all harmonic frequencies above and/or below a fundamental current frequency to the power of the fundamental I current frequency.

inductor—a device that becomes electrically charged when positioned near a charged body.

inverter—a device that converts DC power to AC power or AC power to DC power.

medium voltage—a rated voltage greater than 690 volts (V) and less than 69 kilovolts (kV). In some embodiments, medium voltage may be a voltage between about 1000 V and about 69 kV.

parallel—an arrangement of electrical devices in which all positive poles, electrodes and terminals are electrically coupled to each other, and all negative poles, electrodes and terminals are electrically coupled to each other.

phase—a portion of a circuit exhibiting electrical characteristics that are distinguishable from those of another portion of the circuit.

point of common coupling—a location or area at which a plurality of devices are electrically coupled to each other.

rated power—for a motor, the electrical power applied to the motor for its normal operation at rated speed, typically described in units of watts; for a transformer, rectifier or inverter, a capacity rating expressed in terms of reactive power, such as volts×amps (VA).

reactive current—a measure of a vectorial and/or imaginary component of an alternating current not adapted to perform work.

secondary winding—a wire coil comprised in a transformer adapted to receive transferred energy induced from an alternating current conducted through a primary winding comprised in the transformer.

self-regulating—for an inverter or power cell, having the ability to turn on or off to regulate internal voltage using a local control;

series—an arrangement of the elements of an electric circuit whereby the whole current passes through each element without branching.

substantially—to a great extent or degree.

Figure 2:
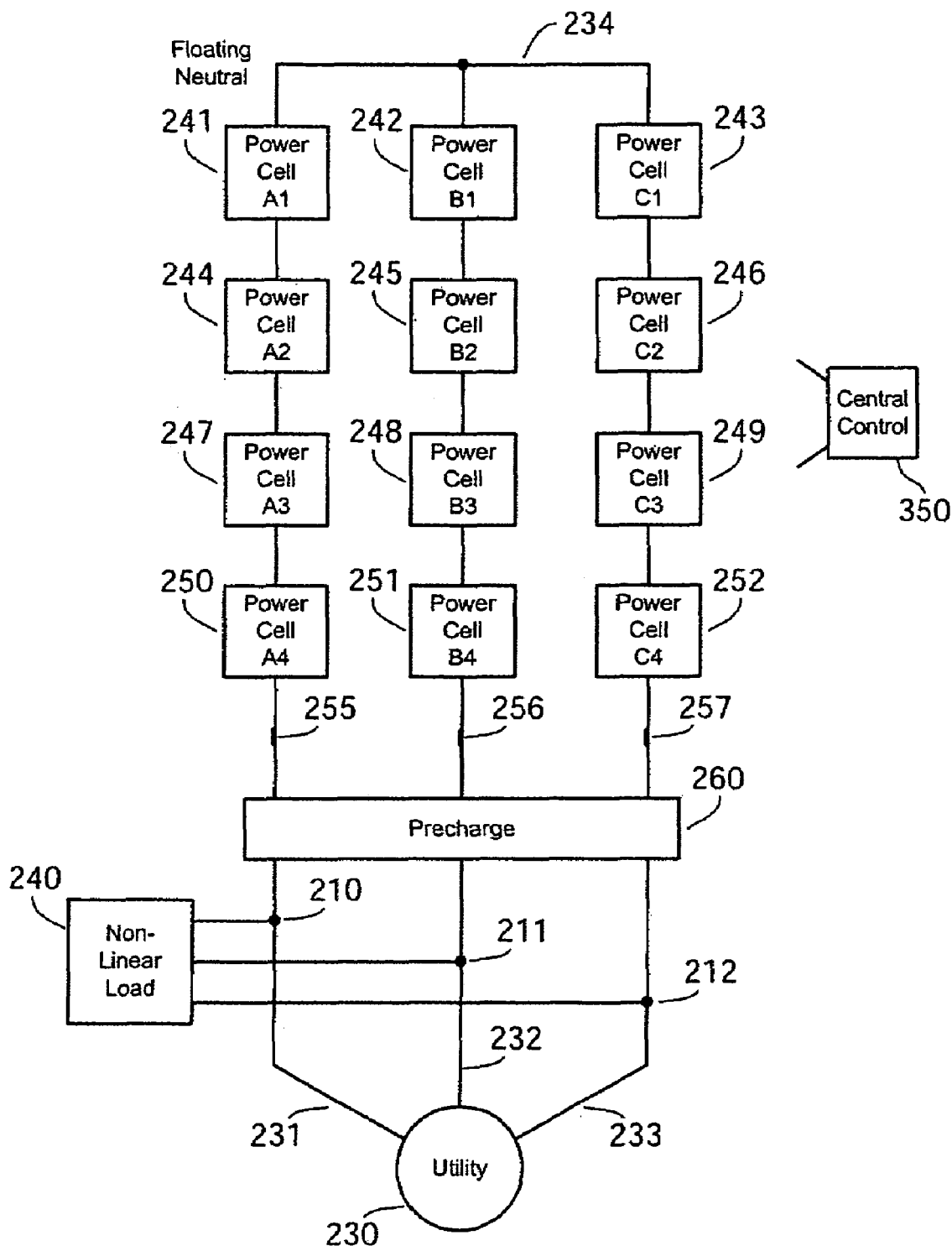
FIG. 2 is a circuit diagram of an exemplary active filter circuit electrically connected between a power source and a load.

In various embodiments, an active filter uses a medium-voltage pulse-width modulation (PWM) topology to alleviate power quality issues introduced by harmonic currents or low power factor. In FIG. 2, an AC power source 230 such as an electric utility or other power source delivers three-phase, medium-voltage power to a load 240 via output lines 231, 232, and 233.

Each output line is electrically coupled to a phase of the load 240 at a point of coupling 210, 211, and 212. One of three phases of series-connected power cells is also connected to each output line. For example, phase output line 231 may be serially connected with power cells 241, 244, 247 and 250. Likewise, phase output line 232 may be serially connected with power cells 242, 245, 248 and 251. Similarly, phase output line 233 may be serially connected with power cells 243, 246, 249 and 252. In the present embodiment, it is preferred that the output lines and the cells' feeding branches 231, 232 and 233 are joined by a WYE connection 234 with a floating neutral.

It should be noted that the number of cells per phase depicted in FIG. 2 is exemplary, and more or less than four cells per phase may be possible in various embodiments. For example, in one embodiment which can be applied to 2300 volts AC (VAC) inductive motor loads, three power cells may be used for each of the three phase output lines. In another embodiment, which may be applied to a 4160 VAC inductive motor load, five power cells may be used for each of the three phase output lines. Such an embodiment may have eleven voltage states which may include approximately +/−3000 volts DC (VDC), +/−2400 VDC, +/−1800 VDC, +/−1200 VDC, +/−600 VDC and zero VDC.

A three-phase non-linear load 240 may be connected to the feeding or output branches 231, 232 and 233. By connecting the load 240 in this manner, the load is connected to the output of the inverter at one end of each power cell series, while other end of each power cell series serves as the floating neutral at WYE 254. Non-linear load 240 may serve as a source of harmonic current under non-filtered conditions. Thus configured, power cells 241 through 249 can actively filter harmonic components delivered from source 230 to load 240.

Figure 3:
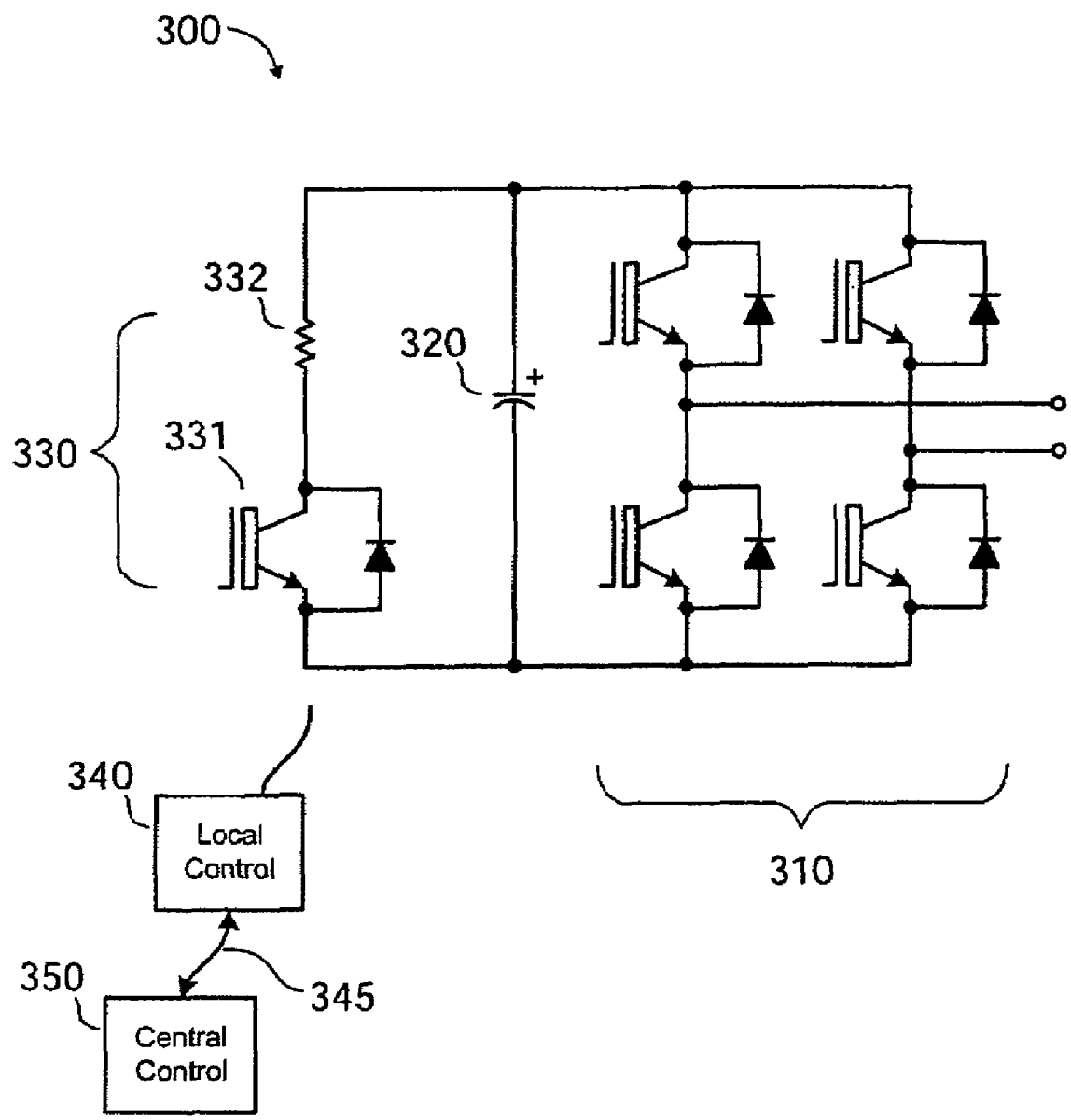
FIG. 3 is a circuit diagram of an exemplary power cell.

A schematic of an exemplary power cell is illustrated in FIG. 3. Referring to FIG. 3, each power cell 300 may include an H-bridge inverter 310 comprising four transistor/diode combinations to generate an AC output voltage. In other embodiments, other inverters may be used instead of the H-bridge inverter, such as a single-phase neutral-point-clamped (NPC) inverter or another DC-to-single-phase AC inverter. Each cell also may include a capacitor or capacitor bank 320 electrically connected in parallel with (i.e., across the DC terminals of) the inverter 310 to provide filtering of high-frequency components and energy storage. Further, each cell may include an energy dissipating circuit 330 electrically connected in parallel to the H-bridge inverter. The energy dissipating circuit 330 may include a transistor 331, such as an insulated gate bipolar transistor (IGBT) or a metal oxide semiconductor field effect transistor (MOSFET) or an integrated gate commuted thyristor (IGCT) and a resistor 332, in order to help regulate DC bus voltage in the power cell. The energy dissipating circuit 330, such as a brake or other device, can be activated to dissipate energy through the resistive element 332. A local control circuit 340 for each cell receives commands from a central control system 340 via a fiber optic link, communications line, wireless communication or any other communications network or device 345 to provide gating signals for the inverter devices. The transistor 331 of the energy dissipating circuit is controlled by the local control circuit 340 which attempts to maintain the DC voltage across the capacitor 320 at a pre-determined value. The local control circuit 340 can be any circuit having the ability to activate and deactivate the energy dissipating circuit, such as a Zener diode/resistor combination. However, the local control circuit 340 is not limited to this function or combination, and other functions and circuit elements are possible.

Figure 4:
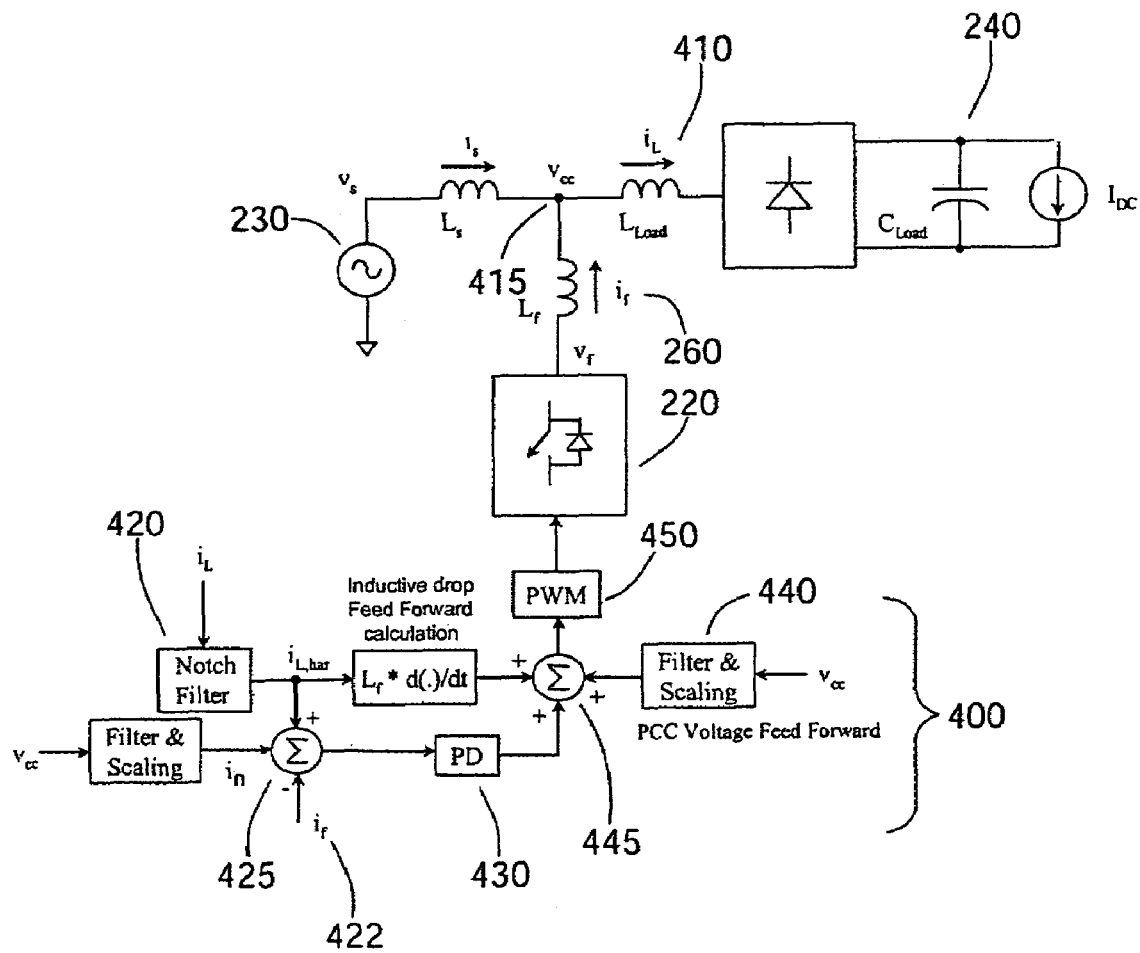
FIG. 4 is a circuit diagram of an exemplary application of an active filter of the present disclosure.

Referring again to FIG. 2, the active filter has a central control system that provides commands to each power cell via local controllers. The central control system uses the measured load current and the voltage at the point of common coupling (PCC) to determine the gating commands of the inverter devices. FIG. 4 illustrates an exemplary circuit in which an active filter of the present disclosure may be implemented with a control system. Referring to FIG. 4, an active filter 220 is connected between an AC power source 230 and a load 240. In FIG. 4, the exemplary load includes a 6-pulse rectifier with a DC capacitor and a DC current source. A small AC line inductor 410 is present to control harmonics in load current $i_L$. The control circuit 400 is described below. Other control circuits may be used.

The objective in the example of FIG. 4 is to control the active filter current ($i_f$) to cancel all, or substantially all, of the harmonic components of the load current ($=i_{L,har}$).

Hence, the voltage generated by the active filter is given by $$v_f = v_{cc} + i_f Z_f = v_{cc} + (i_L - i_{L1}) Z_f \quad (1)$$

where, $$i_f = i_{L,har} = i_L - i_{L1} \text{ and } Z_f = \omega L_f \quad (2)$$

In the above equations, $Z_f$ is the impedance of the active filter inductance, $i_{L1}$ is the fundamental component of the load current and $v_{cc}$ is the voltage at the point of common coupling 415 (corresponding to 210, 211 and 212 in FIG. 2). The control for the active filter is based on equation (1). The control circuit requires measurement of the drive current ($i_L$), the active filter current ($i_f$) and the voltage at the point of common coupling ($v_{cc}$). A notch filter 420 removes the fundamental component from the measured load current. A fundamental current component 180° out-of-phase with the voltage at the PCC is added using device 422 to the output of the notch filter. This fundamental component represents the small amount of power that needs to be absorbed to ensure that the DC voltage in each power cell is at or above the pre-determined level. The sum of these two signals, the notch filter output and the fundamental component, is compared by a comparator 425 with the measured active filter current to obtain a current error that forms an input to a proportional+derivative (PD) regulator 430. Feed-forward to the active filter control 450 is provided by using (a) one or more devices 440 for scaling and filtering the PCC voltage, and (b) one or more devices 445 for differentiating the load harmonic current signal and scaling with the known value of the filter inductance ($L_f$). The sum of the regulator 430 output along with the feed-forward signals forms voltage reference signal to the pulse width modulation (PWM) comparators of the control system 450. The PWM comparators convert the three-phase voltage commands to phase-shifted gating signals for each power cell resulting in a voltage output that has multiple output levels.

The exemplary central control described here forces a small amount of real power to be absorbed by the power cells, to relieve itself of the onerous task of controlling the DC voltage within each power cell. Instead, the central control system regulates power flow into the active filter, ensuring that DC voltage is shared among the power cells/inverters. The real power absorbed by each power cell forces the DC voltage to increase above the pre-determined voltage level which is sensed by the individual local cell controllers. These local controllers then control the transistor of the energy dissipating circuit to reduce the DC voltage, thereby maintaining a near constant value. Thus, the central control system needs to send only the gating commands for all the inverter devices to the power cells.

Figure 5:
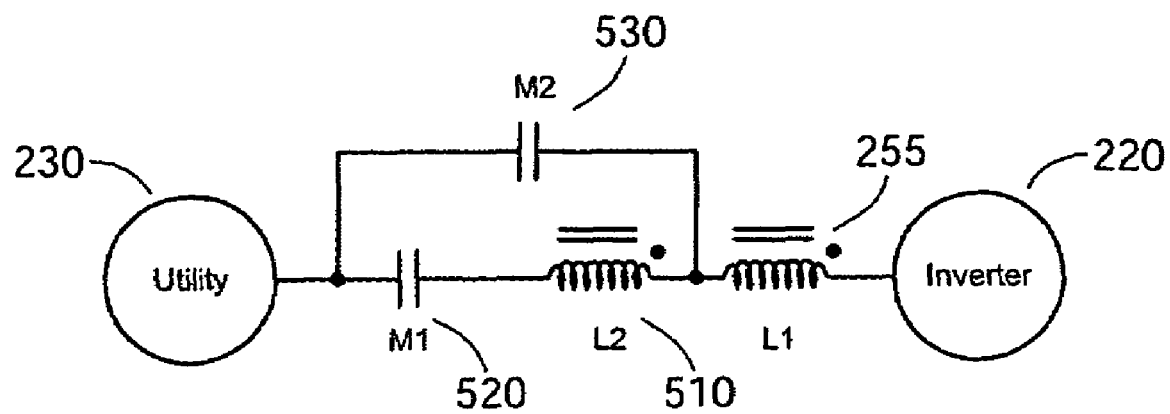
FIG. 5 is a circuit diagram of an exemplary precharge circuit

Referring back to FIG. 2, the active filter may include one or more optional inductors 255, 256 and 257 on each phase and a pre-charge circuit 260 on the output side of the inverter 220. The pre-charge circuit 260 may help to limit in-rush during power-up. FIG. 5 illustrates an exemplary pre-charge circuit that may be present for each phase. Referring to FIG. 5, the pre-charge circuit may include a first inductor 255 to serve as a filter and a second inductor 510 connected in series with first inductor 255. First contactor 520 is electrically connected in series with second inductor 510, and second contactor 530 is electrically connected in parallel with the second inductor/first contactor combination.

The second inductor 510 may limit pre-charging current and is generally larger in inductance, in some embodiments as much as several times larger, than the first inductor 555. In some embodiments where space limitations are desirable, first inductor 555 and second inductor 510 may include a single core, with first inductor 255 having fewer turns than second inductor 510. In addition, in some embodiments the second inductor 510 may use a smaller gauge wire for its turns than first inductor 255, as second inductor 510 may be used for relatively short periods of time.

A sequence for operating the pre-charge circuit may include: (1) closing first contactor 520; (2) when a maximum voltage is established in the inverter terminals and all power cells have charged to nominal DC voltage, closing second contactor 530; (3) after confirming that second contactor 530 is closed, opening first contactor 520; and (4) after confirming that first contactor is open, the pre-charging sequence is complete.

A control system may monitor the power cell voltages and activate the contactors in accordance with the sequence listed above. The control system may be local to the inverter, or it may be remote from the inverter, with local monitoring devices communicating with remote control equipment via a communications network.

EXAMPLES

Figure 6:
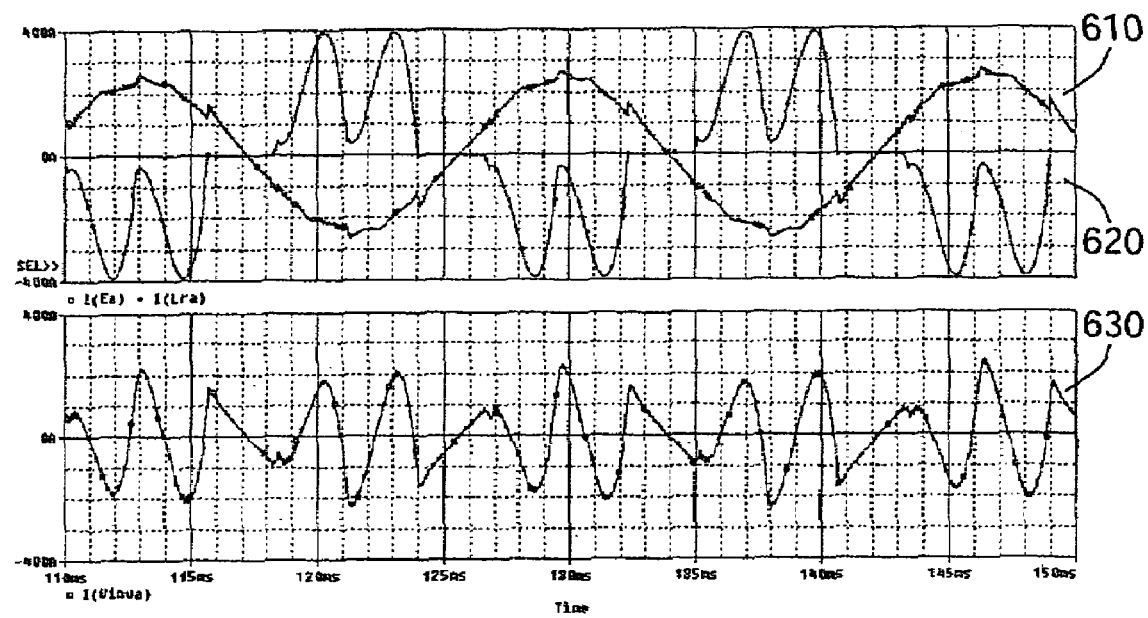
FIG. 6 is an illustration of a utility current, load current, and active filter current from an exemplary implementation of an active filter.
Figure 7:
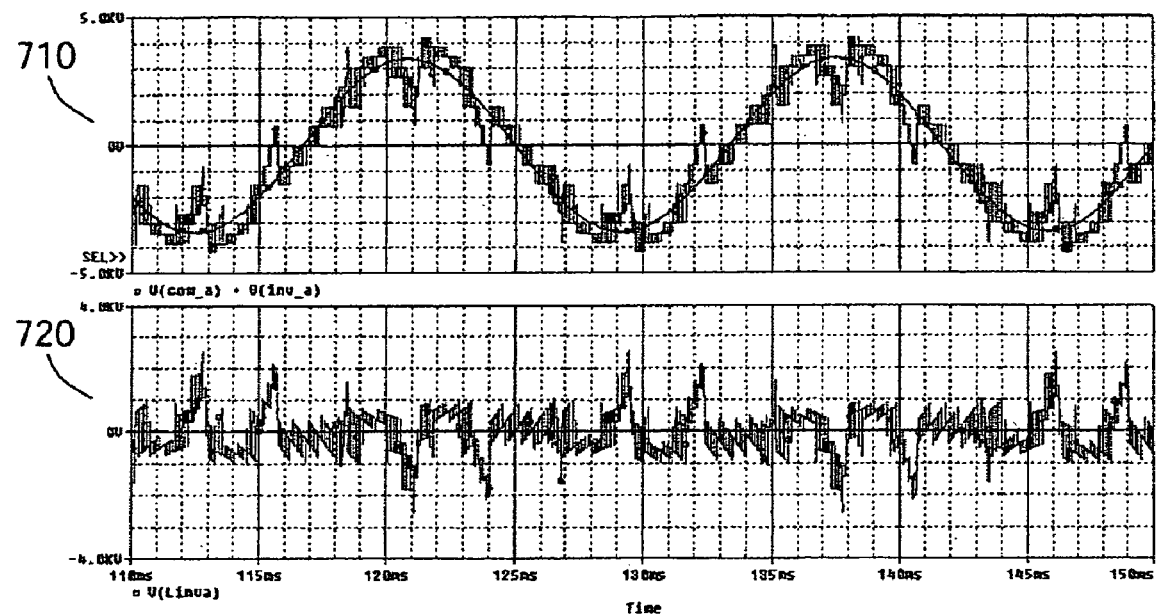
FIG. 7 illustrates the waveforms of FIG. 6 with a switching component.

As an example, an active filter may include a total of nine cells (three per phase), each with 1150V DC bus voltage. In such a setup, the total AC voltage capability of the filter may be 4.88 kV. FIG. 6 shows the exemplary utility current 610, load current 620 and active filter current 630 waveforms. The utility current total harmonic distortion (THD) is 4.6%, and the RMS active filter current is 109A in this example. The 62% load distortion represents the maximum load distortion that this exemplary active filter can compensate while maintaining a THD of 5% or lower in the utility current. FIG. 7 shows the active filter output voltage 710 and the inductor voltage 720 waveforms for this example.

Figure 8:
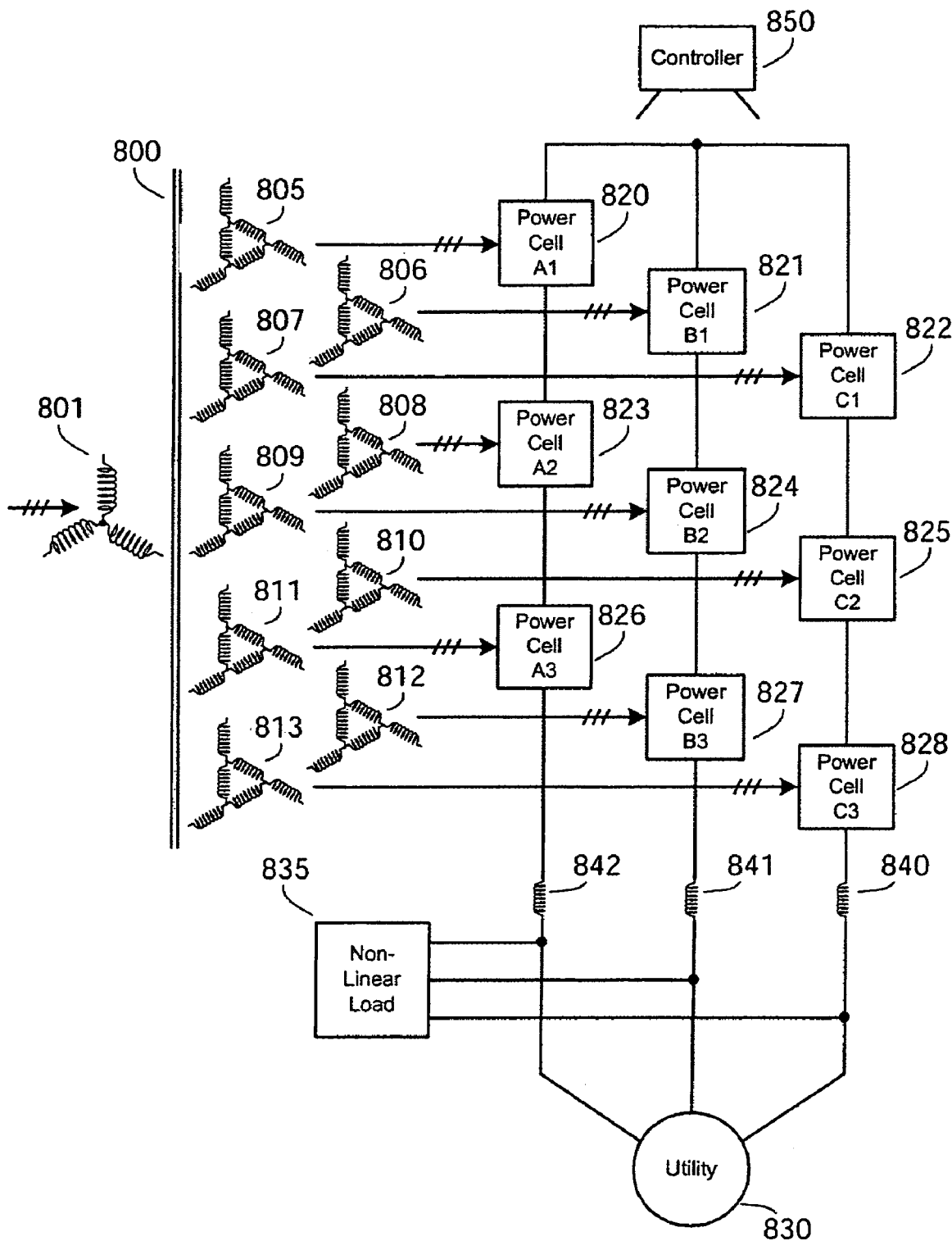
FIG. 8 illustrates an alternate active filter that includes an input transformer.

In an alternate embodiment, as illustrated in FIG. 8, a configuration similar to that in FIG. 2 also includes a transformer 800 having a primary winding 801, shown in a star configuration but optionally in a delta configuration, and a plurality of secondary windings 805-816. The active filter will have a rating of its capacity to handle reactive power, expressed in terms such as a volt-ampere (VA) rating. In the embodiments described herein, the transformer 800 VA rating need not match that of the active filter, and in fact it can be relatively low as compared to the active filter. In some embodiments, the transformer may have a VA rating that is less than 100% of the rating of the active filter. For example, the transformer rating may be less than 75%, less than 50%, or less than 40% of the rating of the active filter. To reduce costs, the transformer rating may be relatively small as compared to that of the active filter. For example, the rating of the transformer may be less than 20% of the rating of the active filter, less than 10% of the rating of the active filter, or between about 1% and about 5% of the rating of the active filter. However, it is not a requirement that the transformer rating be less than that of the filter in all embodiments.

Figure 9:
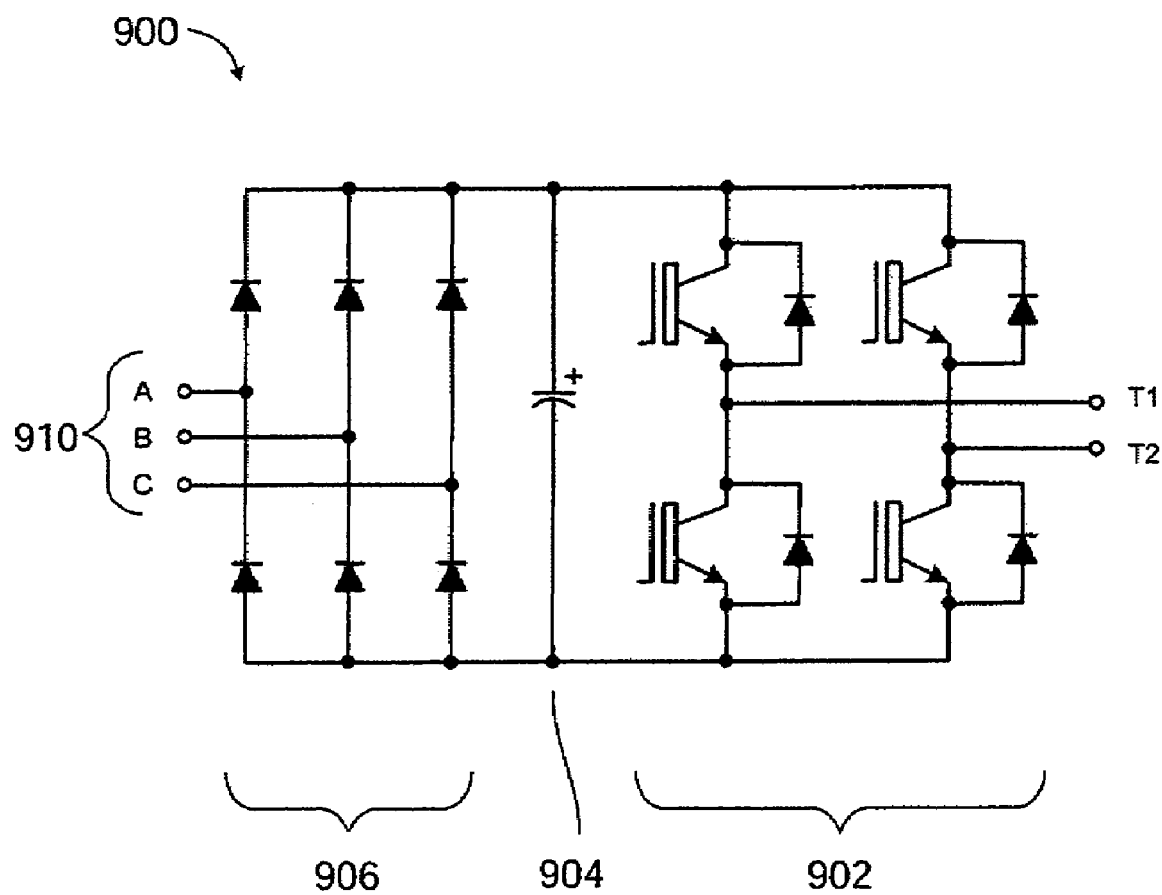
FIG. 9 illustrates an alternate power cell configuration for the active filter of FIG. 8.

Each secondary winding of the transformer is electrically connected to a power cell, with the remainder of the inverter configuration being similar to that of FIG. 2, except that a pre-charger is not needed as described in more detail below. Various options for such a configuration are described in, for example, columns 4 through 6 of U.S. Pat. No. 5,625,545, the disclosure of which is incorporated herein by reference. In such a configuration, referring to FIG. 9 each power cell 900 may include an H-bridge inverter 902, capacitor or capacitor bank 904 connected in parallel with (i.e., across the DC terminals of) the H-bridge inverter 902, and an input rectifier 906 having a relatively low rating, such as a rating similar to that of the transformer. In this embodiment the transformer 800 with a low VA rating can function as the pre-charge device for the power cells, thereby avoiding the need for additional components to accomplish pre-charge. Each power cell is electrically connected to a set of dedicated three-phase secondary windings of the transformer to receive power at an input 910 of the power cell. In some embodiments, the power ratings of the rectifiers within each cell may be substantially low to meet the requirements of the losses of the active filter system and the requirements of voltage sharing. For example, a rectifier may have a VA rating that is less than 100% of the rating of its corresponding power cell. For example, a rectifier may have a rating that is may be less than 75%, less than 50%, or less than 40% of the rating of its cell. Optionally, the rating of a rectifier may be less than 20%, less than 10%, or between about 1% and about 5% of the rating of its corresponding power cell. However, it is not a requirement that the rectifier rating be less than that of its corresponding cell in all embodiments.

The control of such an arrangement may be similar to that shown in FIG. 4, with one difference in the phase-shift of the fundamental current component that needs to be provided by the active filter. The fundamental current component from device 422 may be such that real power will be output from each inverter forcing the diode rectifiers in each power cell to conduct and hence maintain substantially equal DC voltages. Thus, even in this second embodiment, the central control system (850 in FIG. 8) may not be required to maintain individual cell voltages, but it can indirectly control the cells through the power flow from each inverter.

It should be understood that numerous variations, modifications, and additional embodiments are possible, and accordingly, all such variations, modifications, and embodiments are to be regarded as being within the spirit and scope of this application. For example, regardless of the content of any portion of this application, unless clearly specified to the contrary, such as via an explicit definition, there is no requirement for the inclusion in any claim herein of any particular described or illustrated characteristic.

What is claimed is:

1. A multi-phase active filter, comprising:
   a plurality of phases, each phase comprising a plurality of power cells electrically connected in series;
   wherein each phase has a first end and a second end, the first ends of each phase are electrically coupled to each other, and the second ends of each phase are positioned to be electrically connected between a power source and a load at a point of common coupling;
   wherein each power cell comprises:
   an inverter having a pair of direct current (DC) terminals,
   a filter device that is electrically connected across the DC terminals of the inverter, and
   an energy dissipating circuit that is electrically connected across the DC terminals of the inverter.

2. The filter of claim 1, wherein the power cells filter harmonic current generated by the load.

3. The filter of claim 1, wherein each inverter comprises either an H-bridge inverter or a neutral point clamped single-phase inverter.

4. The filter of claim 1, wherein the filter device comprises at least one capacitor electrically connected in parallel with the inverter.

5. The filter of claim 1, further comprising a central controller that ensures DC voltage sharing in each inverter by regulating power flow, wherein each power cell self-regulates its DC voltage using its energy dissipating circuit.

6. The filter of claim 1, further comprising a precharging circuit.

7. The filter of claim 6, wherein each precharging circuit comprises:
   a first contactor, a first inductor, and a second inductor electrically connected in series such that the first contactor is between the first inductor and the second inductor, and
   a second contactor electrically connected in parallel across the first contactor and first inductor; and
   wherein the first contactor closes to energize the power cells, the second contactor closes when the power cells have charged to a nominal DC voltage, and the first contactor opens after the second contactor has closed.

8. The filter of claim 7, further comprising a controller that monitors the voltage of each power cell and activates or deactivates the first contactor and second contactor based on data that it received from monitoring.

9. The filter of claim 1, wherein energy dissipating circuit comprises a transistor and a resistor, and wherein the transistor shorts the inverter through the resistor to cause dissipation of energy though the resistor.

10. The filter of claim 9, further comprising a control circuit for each cell that activates the cell transistor and self-regulates voltage in the cell.

11. A multi-phase active filter, comprising:
a plurality of phases, each phase comprising a plurality of power cells electrically connected in series; and
a central controller;
wherein each phase has a first end and a second end, the first ends of each phase are electrically coupled to each other, and the second ends of each phase are positioned to be electrically connected between a power source and a load at a point of common coupling;
wherein each power cell comprises an inverter having a pair of DC terminals, a rectifier electrically connected across the DC terminals, and a capacitor that is electrically connected across the DC terminals;
wherein each rectifier receives power from a set of dedicated three-phase secondary windings of a transformer; and
wherein the central controller comprises:
a device that scales and filters signals from the point of common coupling, and
a regulator that receives the filtered signals and provides an output to one or more pulse width modulation comparators.

12. The filter of claim 11, wherein the transformer is external to the filter and has a volt-ampere rating that is less than a volt-ampere rating of the filter.

13. The filter of claim 12, wherein the transformer rating is about 5 percent or less than the volt-ampere rating of the filter.

14. A multi-phase active filter, comprising:
a plurality of power cells electrically connected in a three-phase configuration;
a precharging circuit; and
a controller that controls the voltage delivered to the plurality of power cells;
wherein each power cell comprises an inverter having a pair of direct current (DC) terminals, at least one capacitor electrically connected in parallel with the inverter, and an energy dissipating circuit that is electrically connected in parallel with the inverter;
wherein the energy dissipating circuit of each power cell self-regulates DC voltage within the cell; and
wherein the precharging circuit comprises:
a first contactor a first inductor and a second inductor electrically connected in series such that the first contactor is between the first inductor and the second inductor; and
a second contactor electrically connected in parallel across the first contactor and first inductor;
wherein the first contactor closes to energize the power cells the second contactor closes when the power cells have charged to a nominal DC voltage, and the first contactor opens after the second contactor has closed.

15. The filter of claim 14, wherein the power cells fiber harmonic current generated by a load.

16. The filter of claim 14, wherein each inverter comprises either an H-bridge inverter or a neutral point clamped single-phase inverter.

17. The filter of claim 14, further comprising a point of common coupling that electrically connects an output of the precharging circuit, a power source, and a load.

18. The filter of claim 14, further comprising a controller that monitors the voltage of each power cell and activates or deactivates the first contactor and second contactor based on data that it received from monitoring.

19. The filter of claim 17, wherein the controller comprises:
a device that scales and filters signals from the point of common coupling, and
a regulator that receives the filtered signals and provides an output to one or more pulse width modulation comparators.

20. A multi-phase active filter, comprising:
a plurality of phases, each phase comprising a plurality of power cells electrically connected in series; and
a precharging circuit;
wherein each phase has a first end and a second end, the first ends of each phase are electrically coupled to each other, and the second ends of each phase are positioned to be electrically connected between a power source and a load at a point of common coupling;
wherein each power cell comprises an inverter having a pair of direct current (DC) terminals and an energy dissipating circuit that is electrically connected across the DC terminals of the inverter;
wherein the precharging circuit comprises:
a first contactor, a first inductor, and a second inductor electrically connected in series such that the first contactor is between the first inductor and the second inductor, and
a second contactor electrically connected in parallel across the first contactor and first inductor; and
wherein the first contactor closes to energize the power cells, the second contactor closes when the power cells have charged to a nominal DC voltage, and the first contactor opens after the second contactor has closed.

* * * * *